(12) United States Patent
Rothman et al.

(10) Patent No.: US 7,234,054 B2
(45) Date of Patent: Jun. 19, 2007

(54) METHOD AND APPARATUS FOR ENABLING PLATFORM CONFIGURATION

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 432 days.

(21) Appl. No.: 10/775,863

(22) Filed: Feb. 9, 2004

(65) Prior Publication Data
US 2005/0177710 A1    Aug. 11, 2005

(51) Int. Cl.
*G06F 9/00* (2006.01)
(52) U.S. Cl. .......................................... 713/2; 715/700
(58) Field of Classification Search ................ None
See application file for complete search history.

(56) References Cited

U.S. PATENT DOCUMENTS

| | | | | |
|---|---|---|---|---|
| 6,065,125 | A | * 5/2000 | Shiell et al. ................ | 713/330 |
| 6,823,451 | B1 | * 11/2004 | Gulick et al. ............... | 713/153 |
| 2002/0169951 | A1 | 11/2002 | Zimmer | |
| 2002/0169979 | A1 | 11/2002 | Zimmer | |

FOREIGN PATENT DOCUMENTS

EP       1357454 A1   * 10/2003

OTHER PUBLICATIONS

Nonpublished US Patent Application, "Technique for Reconstituting a Pre-Boot Firmware Environment After Launch of an Operating System", U.S. Appl. No. 10/324,263, filed Dec. 18, 2002 to Zimmer et al.
Intel E7500 Chipset Datasheet, Intel E5700 Memory Controller Hub (MCH) Feb. 2002, Document No. 290730-001.
Mark Doran, "From Research and Development at Intel: Beyond the BIOS", Intel Corporation, Feb. 19, 2003.
Insyde Software, "Keyboard Controller Firmware for Hitachi IKAP Family", Information Appliance Products, www.insyde.com/solutions/ia/ikap.com, Feb. 9, 2004.
E-mail discussion thread, RE: Missing Interrupts, Mar. 19, 2003.

* cited by examiner

*Primary Examiner*—James K. Trujillo
*Assistant Examiner*—Anand B. Patel (57) ABSTRACT

A method and related apparatuses provide a virtual runtime interface for modifying basic input/output system (BIOS) settings. A processing system may provide the virtual runtime interface after the processing system has booted an operating system (OS). User input that specifies a modified BIOS setting may be received through the virtual runtime interface. To provide the virtual runtime interface, the system may transition from an OS context to a system management mode (SMM) context, and may determine whether the amount of time spent in the SMM context approaches an SMM time limit. If the amount of time spent in the SMM context approaches the SMM time limit, the system may automatically transition from the SMM context back to the OS context. Other embodiments are described and claimed.

7 Claims, 6 Drawing Sheets

METHOD AND APPARATUS FOR ENABLING PLATFORM CONFIGURATION

FIELD OF THE INVENTION

The present invention relates generally to the field of data processing, and more particularly to a method and related apparatuses for enabling configuration of data processing platforms.

BACKGROUND

A typical legacy data processing system includes firmware instructions that control the system when the system is being powered up or has been reset, before an operating system (OS) is booted. That is, the firmware controls the pre-OS operations (also known as "pre-boot" operations). Those pre-boot operations may include operations for discovering, testing, and initializing hardware within the data processing system, to prepare the system for subsequent tasks, such as loading the OS, executing applications, etc. The firmware that controls the pre-boot operations may be referred to in general as a basic input/output system (BIOS).

In personal computers (PCs) and other data processing systems, the BIOS typically includes a collection of computer instructions that may be used in a variety of platforms, as well as various modifiable settings that may be configured for an individual computer. The BIOS instructions and settings are typically saved in non-volatile storage. For instance, the BIOS instructions may be stored in read only memory (ROM), and the BIOS settings may be stored in non-volatile random access memory (NVRAM) or complementary metal-oxide semiconductor (CMOS) memory. For purposes of this disclosure, the term "ROM" may be used in general to refer to non-volatile memory devices such as electrically programmable ROM (EPROM), electrically erasable programmable ROM (EEPROM), flash ROM, flash memory, etc.

A portion of the BIOS instructions may constitute a BIOS setup program. The BIOS setup program may provide a user interface that allows the user to modify the BIOS settings. In some data processing systems, however, it is very difficult to launch the BIOS setup program. For instance, some systems provide only a very narrow window of time in which the user is allowed to launch the BIOS setup program. Industry standards, certification requirements of OS vendors, or other constraints may dictate that the launching of an OS must begin in less than seven seconds, for example. Accordingly, a system may provide less then seven seconds during the pre-boot process to allow a user to launch the BIOS setup program, and once the pre-boot process is done, it may be impossible to launch the BIOS setup program without resetting the system to re-enter the pre-boot phase. Furthermore, a typical legacy data processing system does not provide a user-friendly mechanism for launching the BIOS setup program, such as a graphical user interface (GUI) or menu-based interface. Instead, the typical system requires the user to press a particular key or combination of keyboard keys at the proper time to launch the BIOS setup program.

BRIEF DESCRIPTION OF THE DRAWINGS

The features and advantages of the present invention will become apparent from the following detailed description of one or more example embodiments of the present invention, in which.

DETAILED DESCRIPTION

For purposes of this disclosure, the terms "basic input/output system" and "BIOS" refer to the software that executes on a data processing system to perform operations such as discovering, testing, initializing, and/or configuring hardware within the data processing system. The term thus includes legacy BIOS products, as well as products which may augment, replace, or serve purposes similar to those served by legacy BIOS products, such as firmware or software implemented according to the Extensible Firmware Interface (EFI) model. Version 1.10 of the EFI Specification, dated Dec. 1, 2002, may be obtained from www.intel.com/technology/efi/main specification.htm. The term "BIOS settings" refers to the parameters or values that may be modified to customize the way the BIOS operates in a particular system, the way the BIOS initializes the system, the way the BIOS configures the system, the way the system launches the OS, or any combination of these or related operations. The term "BIOS setup program" refers to software that provides an interface which receives user input for modifying the BIOS settings on a data processing system.

Data processing systems typically spend more than ninety-nine percent of their power-on time in the post-boot phase of operation, but conventional systems do not have the ability for BIOS setup programs to be launched during the post-boot phase of operation. Embodiments of the present invention provide means by which one can initiate a BIOS setup program at any time during system operation. For instance, a user may launch the BIOS setup program and modify BIOS settings after the OS has been booted, without resetting the system or otherwise disturbing the current operational environment.

Once an OS has been loaded, a data processing system typically executes in the OS context (i.e., a context that is controlled primarily by the OS). Operations that are executed within the OS context may be referred to as OS runtime operations. Occasionally, however, the system may briefly switch from the OS context to a system management mode (SMM) context. For instance, the system may switch to the SMM context to perform power-management operations.

The system may also include a keyboard that contains dedicated keys for transmitting certain types of SMM requests. For example, a laptop computer may include keys for activating a low power operating state such as sleep mode, for adjusting screen brightness, and for adjusting audio volume. If a user presses one of those keys, the system may respond by briefly switching from the OS context to the SMM context to process the request. This type of processing, which is fairly primitive, may be referred to as interrupt 10 (INT10) through system management interrupt (SMI) processing.

However, it may be necessary to ensure that the SMM context is active for only a short time. For instance, problems such as interoperability issues with the OS may arise for some processing systems if the system does not reenter the OS context within 100 microseconds after leaving the OS context.

Consequently, conventional systems do not use the SMM context to display user interfaces for receiving user input. For instance, a system may display confirmation that an SMM request has been processed, such as a graphic to indicate that the system has increased the volume level. However, conventional systems do not use the SMM context to display check boxes, radio buttons, selectable menus, alphanumeric input fields, or any other type of object that a user could utilize to enter input data.

As described in greater detail below, one embodiment of the present invention provides an ability to have an event, such as an SMI, trigger a switch from the OS context to the SMM context. Then, within the SMM context, a primitive firmware environment may be reconstituted to allow for execution of the pre-boot setup application after the OS has been loaded. In addition, embodiments of the invention provide for interleaving the SMM context with the OS context in such a manner that the user's visual perception is of a seamlessly integrated platform setup interface available from an OS-active system. When the user interacts with the BIOS setup program, that program may proxy configuration requests, and may post updated configuration settings to the appropriate non-volatile store, such as NVRAM or CMOS memory.

For purposes of this disclosure, the terms "system management interrupt" and "SMI" are not limited to interrupts for a particular processor or architecture, but include interrupts for thirty-two bit processors, interrupts for sixty-four bit processors such as processor management interrupts (PMIs), and any similar type of interrupt for other architectures.

As used herein, the term "runtime" refers to operations executed within the OS context. For purposes of this disclosure, the terms "virtual runtime interface" and "VRI" refer to software that executes on a system after an OS has been loaded to generate a user interface for accepting user input data outside of the OS context. Such an interface is considered a virtual runtime interface (VRI) because it may appear to operate within the OS runtime or context, but it may actually operate in another context, such as an SMM context. Operations performed outside of runtime may be referred to as out-of-band operations.

Figure 1:
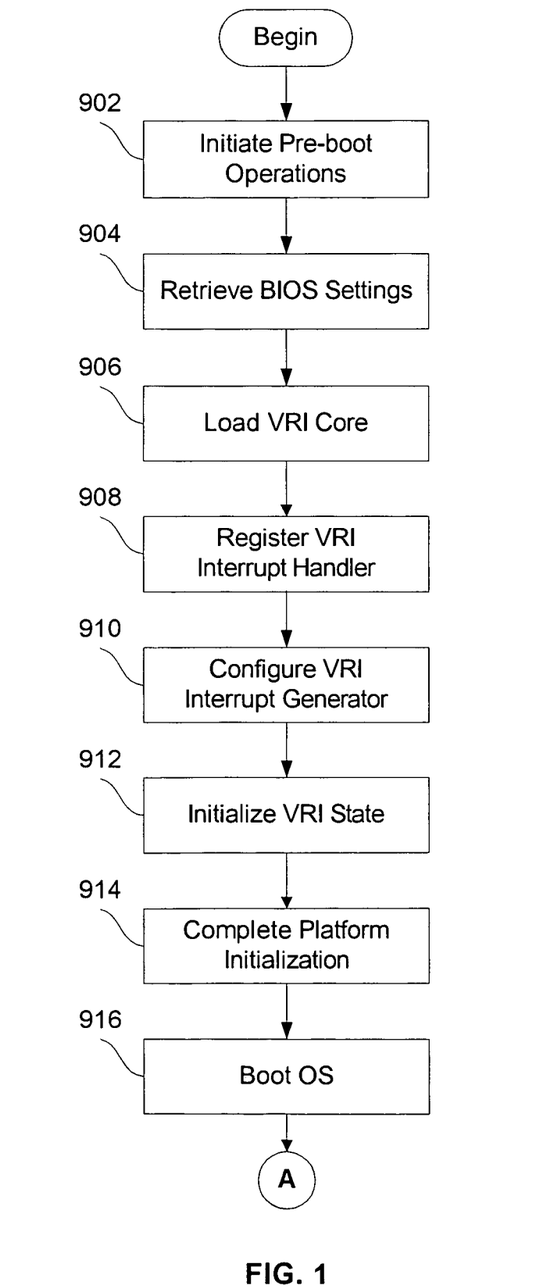
FIGS. 1–3 depict three portions of a flowchart which illustrates a process for providing a virtual runtime interface for configuring BIOS settings according to an example embodiment of the present invention.
Figure 2:
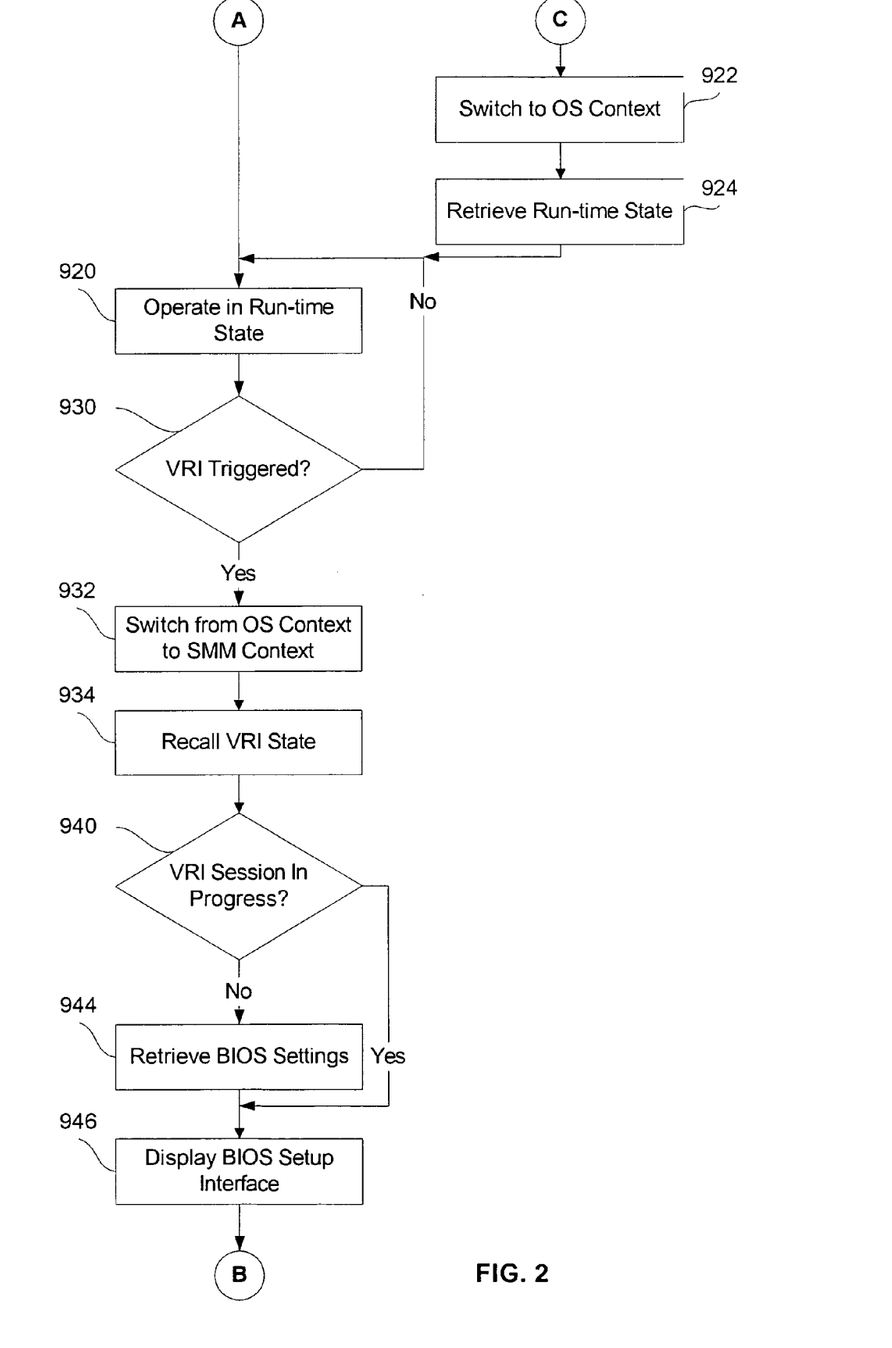
Figure 3:
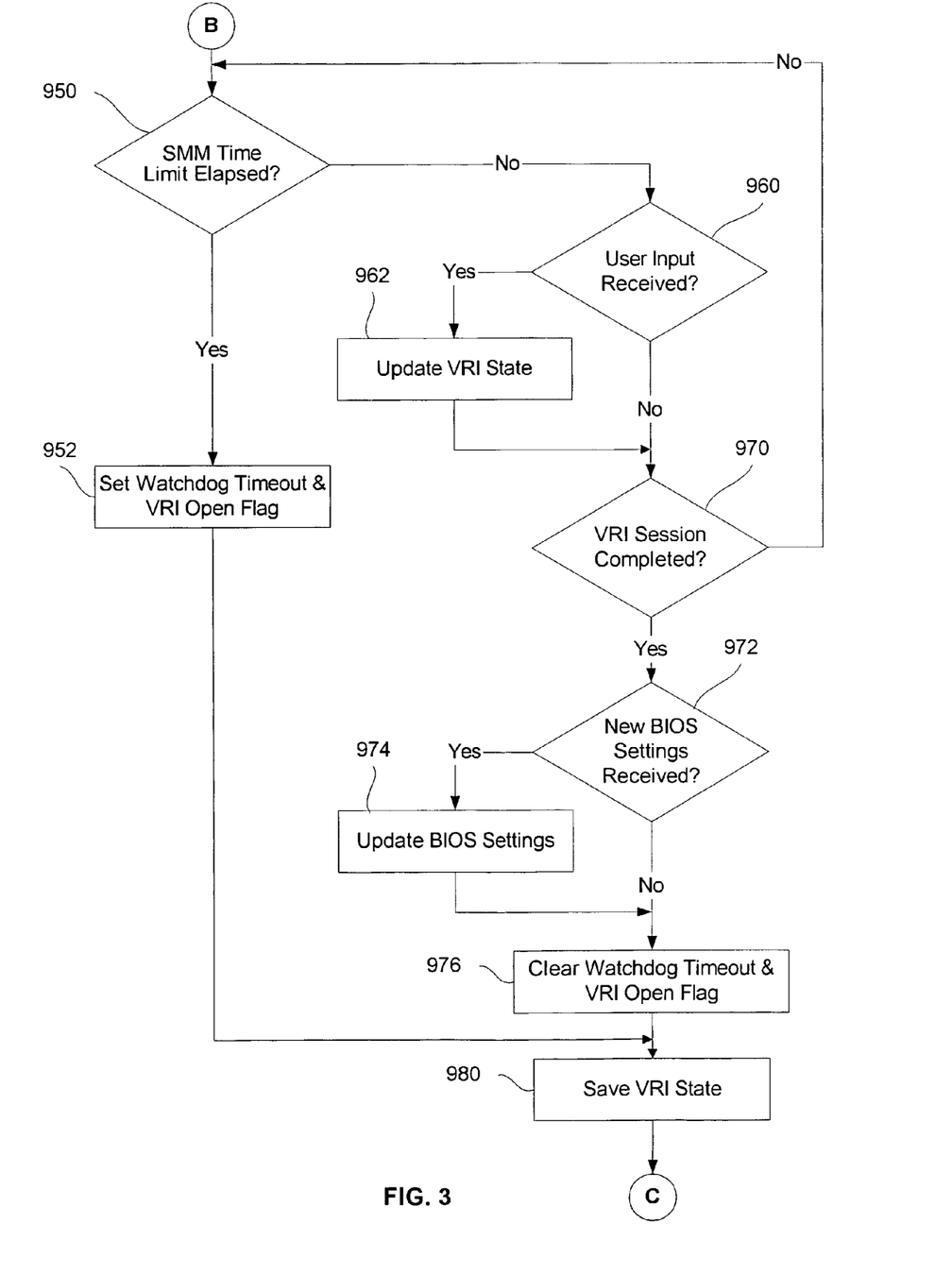

FIGS. 1–3 collectively depict a flowchart which illustrates a process for providing a VRI for configuring BIOS settings according to an example embodiment of the present invention. The illustrated process may execute on a data processing system, and may begin when the data processing system is powered on or reset. As shown at blocks 902 and 904, a BIOS in the data processing system may then initiate pre-boot operations and retrieve BIOS settings for use in the pre-boot operations.

As shown at block 906, the BIOS may load a VRI core when the BIOS is configuring the platform. The VRI core may remain available after completion of system initialization. In one embodiment, the VRI core includes much of the software for causing the system to interleave SMM contexts and OS contexts in a way that makes a BIOS setup interface usable after the OS has been loaded.

As shown at block 908, the BIOS may also load or register one or more VRI interrupt handlers to remain available after completion of system initialization. As described in greater detail below, a VRI interrupt handler may capture VRI interrupts and, in response, cause the system to activate the VRI core. The BIOS may also load or register one or more VRI interrupt generators to remain available after completion of system initialization, as indicated at block 910. For instance, a VRI interrupt generator may be implemented as a set of instructions that detects predetermined types of user input, predetermined system conditions, or both. In response to such input or such a condition, a VRI interrupt generator may issue an event or interrupt such as an SMI, to be handled by a VRI interrupt handler. An interrupt and associated data or parameters may be referred to collectively as an interrupt packet.

Figure 4:
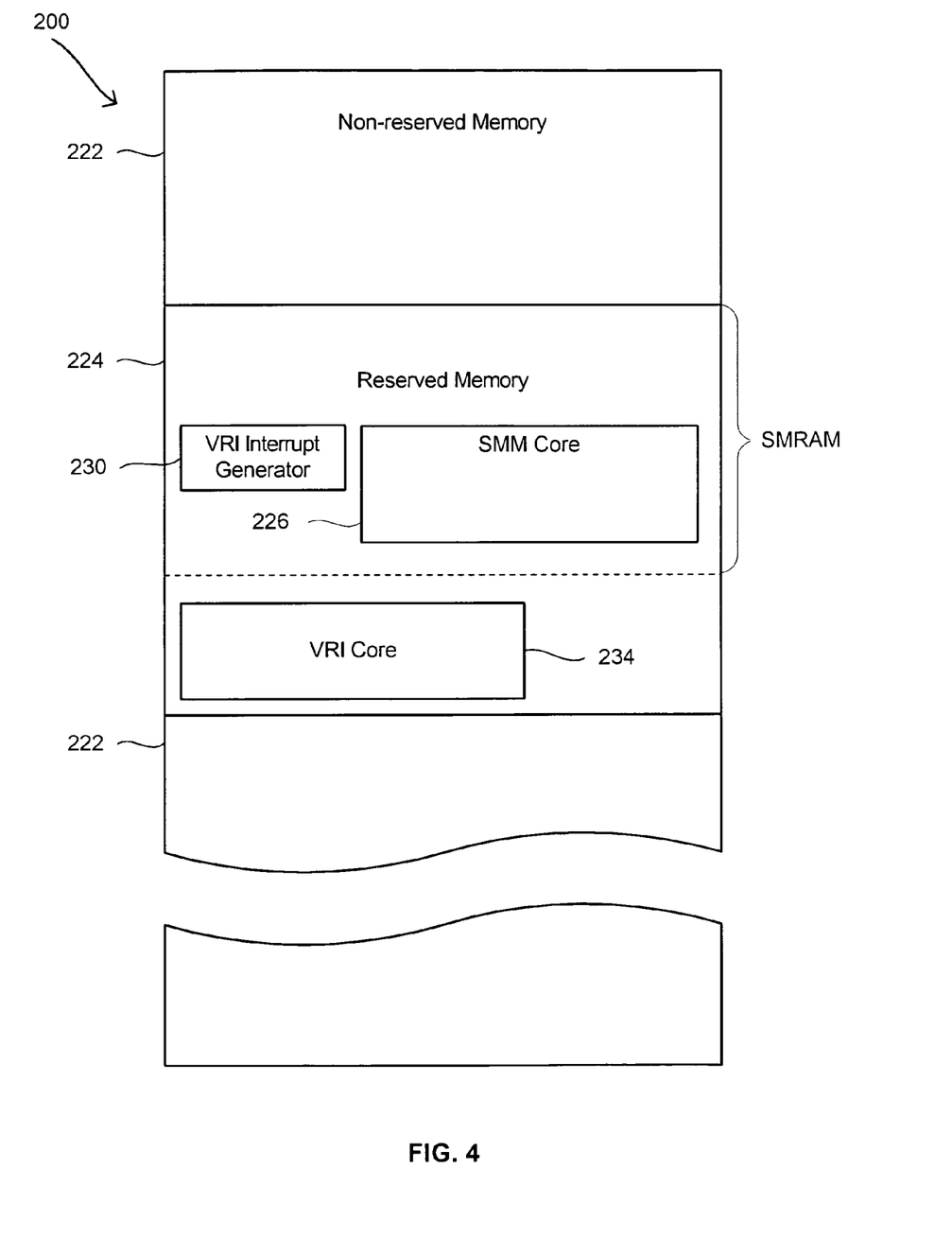
FIG. 4 is a block diagram of a logical address space including components for providing a virtual runtime interface according to an example embodiment of the present invention.
Figure 6:
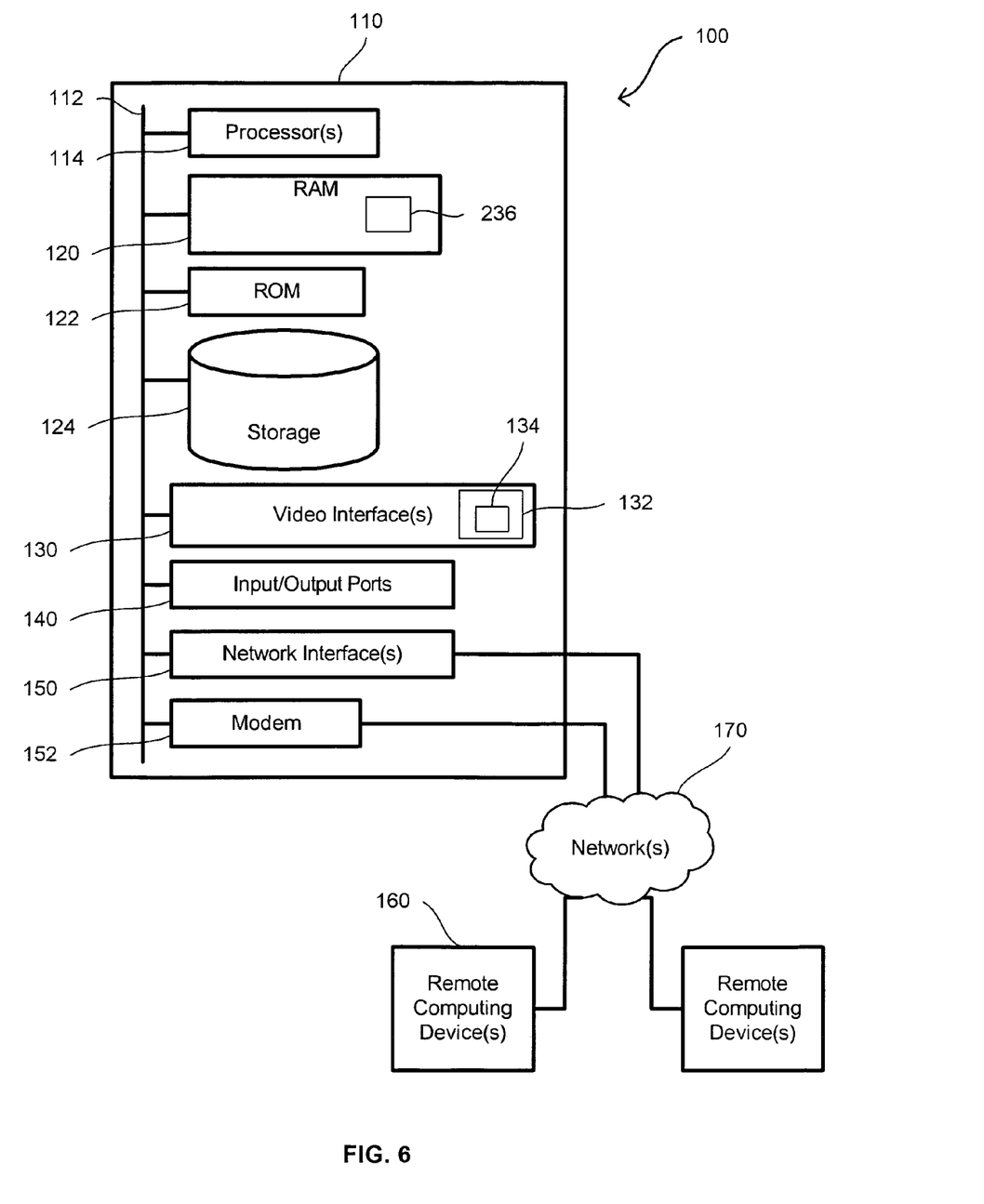
FIG. 6 is a block diagram depicting an example embodiment of a suitable data processing environment in which certain embodiments of the invention may be implemented.

As illustrated in FIG. 4, in one embodiment, the BIOS stores VRI interrupt generator 230, VRI interrupt handler 232, and VRI core 234 in reserved memory 224 in a logical address space 200. The BIOS may also load an SMM core 226 into reserved memory, and the BIOS may implement VRI interrupt handler 232 as part of SMM core 226. Logical address space 200 may also include one or more areas of non-reserved memory 222. In one embodiment, VRI interrupt generator 230 and VRI interrupt handler 232 may be loaded into a portion of random access memory (RAM) configured by a memory controller as system management RAM (SMRAM), and VRI core 234 may be loaded into a different portion of RAM, such as a reserved memory area within a runtime address space. In other embodiments, the storage locations of VRI interrupt generator 230, VRI interrupt handler 232, and VRI core 234 may differ. VRI interrupt Generator 230, VRI interrupt handler 232, and VRI core 234 may be referred to collectively as VRI system 236, as depicted in FIG. 6.

In one embodiment, the BIOS may load a copy of a firmware core such as VRI core 234 into a reserved memory location, and that firmware core can later be called to reinitialize a post-memory subset of the firmware and proxy runtime monitor queries. In an EFI-compliant embodiment, the firmware core may contain a copy of a driver execution environment (DXE) core. In a non-EFI-compliant embodiment, a firmware core may be a monolithic block of code.

Referring again to FIG. 1, during platform initialization the BIOS may initialize VRI core 234, as depicted at block 912. For instance, the BIOS may create initial state information for VRI core 234, with default values for certain attributes, such as an initial value of false for a VRI open flag. As described in greater detail below, the VRI open flag may subsequently be used in the process of providing the VRI.

The BIOS may then complete the platform initialization as shown at block 914, and an OS may then be loaded or booted as indicated at block 916. Continuing through page connector A, the system may then operate in a runtime state (i.e., within the OS context) as depicted at block 920.

At block 930, the system may determine whether the VRI has been triggered. For example, VRI interrupt generator 230 may have been configured to generate an SMI to activate the VRI in response to the user pressing a predetermined key or key combination. In addition or alternatively, VRI interrupt generator 230 may have been configured to generate an SMI to activate the VRI in response to software-based input, such as the user selecting a particular menu item within a runtime GUI. For example, an OS may include a menu or list of programs for activation, such as a "start" menu, and the OS may include an option to start a BIOS setup program on that menu. VRI interrupt generator 230 may generate an SMI for the VRI in response to the user selecting the BIOS setup program from that menu. As described below, the VRI may also be triggered by a watchdog timer associated with a VRI session that is already open or in progress. User input, interrupts, timer triggers, and other inputs such as those describe above may be referred to in general as BIOS configuration trigger events.

If the VRI has not been triggered, the system may continue to operate within the OS context, as indicated by the arrow returning to block 920. However, if the VRI has been triggered, the illustrated process passes to block 932, with VRI interrupt handler 232 causing the system to save the OS state and switch from the OS context to the SMM context. Thus, when the VRI is triggered by the watchdog timer, the system automatically transitions back to the SMM context, ultimately in response to the determinations at blocks 970 and 950 (described below) that a configuration session has not been completed but is to be resumed after an OS context intervenes.

As shown at block 934, VRI interrupt handler 32 may then retrieve state data for the VRI session. That state data may include default data stored during initialization as described above. Alternatively, the VRI state data may include data from a previously activated VRI session. VRI core 234 may then determine whether a new VRI session is being requested or a previously-launched VRI session is being resumed, as shown at block 940. That determination may be made based on the state data for the VRI session. For example, VRI core 234 may determine that a VRI session is being resumed based on a VRI open flag that is set as described below with regard to block 954. As indicated at block 944, if a session is not being resumed, VRI core 234 may retrieve the current BIOS settings from CMOS memory and update the VRI state with those settings.

As shown at block 946, VRI core 234 may then generate a user interface for BIOS setup. The user interface may include one or more screens for viewing the current BIOS settings. A user may also interact with the user interface to modify those settings if desired. In one embodiment, VRI core 234 launches the same BIOS setup program that may be launched in the pre-boot context. Such a BIOS program may be included in the platform BIOS firmware. In another embodiment, a separate BIOS setup program is used for the VRI, such as a slightly modified version of the pre-boot BIOS setup program, or a BIOS setup program that interacts with a user via an application such as a web browser. The BIOS setup program may be implemented as part of VRI core 234, or VRI core 234 may retrieve the BIOS setup program from another repository.

Figure 5:
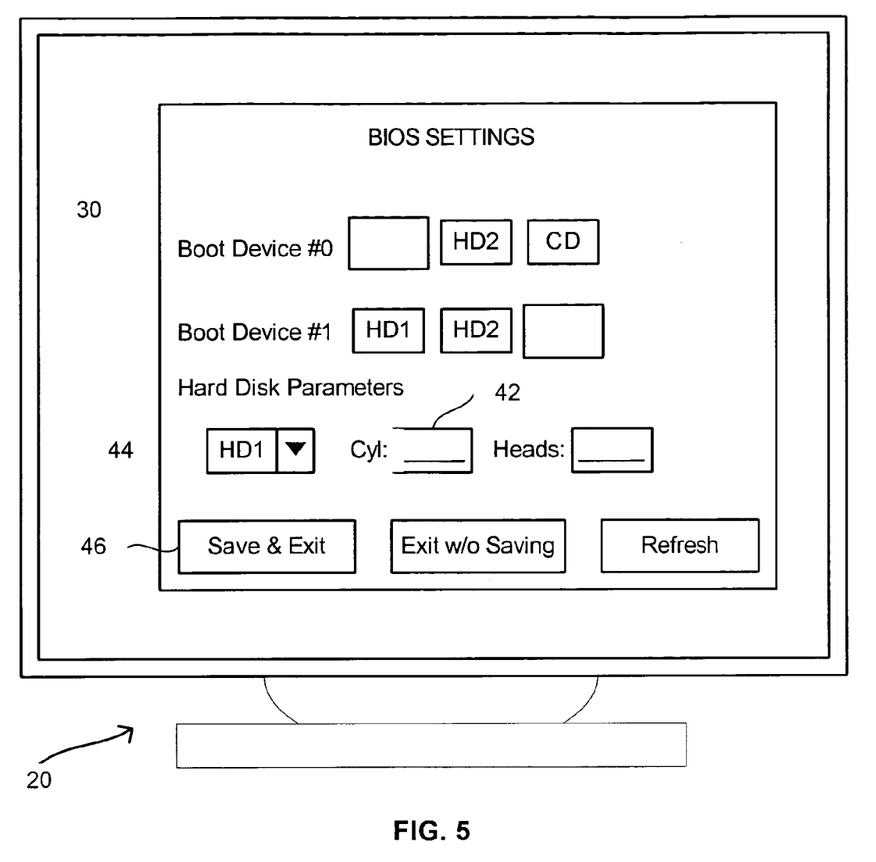
FIG. 5 is a schematic diagram illustrating a user interface for configuring BIOS settings according to an example embodiment of the present invention.

Referring now to FIG. 5, there is depicted a user interface for configuring a platform according to one embodiment of the present invention. The illustrated user interface is a BIOS setup interface 30. VRI core 234 may display BIOS setup interface 30 within a display device 20. BIOS setup interface 30 may be implemented as a GUI that includes one or more screens or windows for displaying the current BIOS settings and for receiving user input to modify those settings. For instance, BIOS setup interface 30 may include on or more sets of radio buttons 40, drop down lists 44, alphanumeric fields 42, controls buttons 46, or any suitable combination of these or other objects or mechanisms for supporting interactive user input.

Referring again to FIG. 2, after VRI core 234 displays the BIOS setup interface, the process may pass from block 946 through page connector B to block 950, which depicts VRI core 234 determining whether SMM mode has been active for a predetermined amount of time. The predetermined amount of time may be referred to as an SMM time limit or threshold, and that threshold may be calculated to result in the system switching back to the OS context in time to keep the OS context operating properly.

To monitor the SMM time limit, VRI interrupt handler 232 or VRI core 234 may set a timer very soon after SMM mode is activated. In addition, the duration of the timer may be set automatically, based on system characteristics such as a central processing unit identifier (CPU-ID) for a system processor. In one embodiment involving a 2.4 gigahertz Intel® Pentium® 4 processor, the SMM time limit may be set at ninety-nine microseconds, for example. When calculating the SMM time limit, the system may adjust the duration to compensate for the time required for the overhead of context switching. For example, in one embodiment, the SMM time limit may be reduced by approximately 0.2 microseconds, to account for the overhead of context switching.

If the SMM time limit has elapsed, VRI core 234 sets a watchdog timer and a VRI open flag, as indicated at block 952. As explained above with regard to block 940, VRI core 234 may subsequently test the VRI open flag to determine whether a VRI session should be resumed. The watchdog timer may be set to automatically trigger the VRI after a predetermined amount of time has elapsed following re-activation of the OS context. The cycle time for the watchdog timer may vary widely in different implementations. In one embodiment, the watchdog timer may be configured to trigger the VRI after approximately 1 second. In some embodiments, the cycle time for the watchdog timer may be a tunable setting, which may be set manually or automatically based on factors relating to hardware and/or software, such as system processor attributes, OS environment, or other attributes or requirements of a particular platform or implementation.

Different mechanisms could be used to implement the watchdog timer in different embodiments. In one embodiment, VRI core 234 may set the watchdog timer by programming the platform chipset to initiate an interrupt after a settable period of time. That interrupt could trigger the VRI, as indicated above with regard to block 930, thereby providing for a periodic switch from the OS context to the SMM context so that a user interacting with the VRI can pick up where the user left off.

As indicated at block 980, VRI core 234 may then save the current state, for example in SMRAM or in some other portion of reserved memory, which may have been reserved during initialization of VRI core 234. The process may then pass through page connector C, and the system may switch back to the OS context and retrieve the state for that context, as indicated at blocks 922 and 924, for instance in response to an SMM resume (RSM) instruction.

Referring again to block 950, if the SMM time limit has not elapsed, VRI core 234 may determine whether it has received input data from a user via the VRI, as indicated at block 960. If so, VRI core 234 may update the VRI state accordingly, as indicated at block 962. For instance, if the user has modified a boot device sequence, the new sequence may be stored in SMRAM or in some other portion of reserved memory. As indicated at block 970, VRI core 234 may then determine whether the current VRI session should be considered complete. The result of this determination may be positive if the user has selected an option to exit the BIOS setup interface, either with or without saving the changes, if any, entered by the user.

In addition, VRI core 234 may determine that the session is complete if no user input has been received for a predetermined period of time. That time period may be referred to as a user timeout limit. In one embodiment, VRI core 234 automatically saves any changes entered by a user as part of the VRI state, so that those changes may be reviewed and implemented, if desired, in a subsequent session, such as a session that may start when the user subsequently enters input for activating the BIOS setup interface. In another embodiment, VRI core 234 automatically discards any unsaved changes and releases the associated storage space if a session times out before the user selects a save option.

If VRI core 234 determines that the session is not yet complete, the process may return to block 950 from block 970. If the session is complete, VRI core 234 may determine of the user has indicated that changes to the BIOS settings should be saved, as shown at block 972. If so, VRI core 234 may update the BIOS settings accordingly, as depicted at block 974, by modifying the contents of a system NVRAM or CMOS memory, for example. VRI core 234 may then clear the watchdog timeout and the VRI open flag, as shown at block 976. VRI core 234 may then save the VRI state, as indicated at block 980. The process may then pass through page connector C, and the system may return to the OS context, as described above with regard to blocks 922 and 924.

Thus, the process described above with regard to FIGS. 1–3 provides a VRI which allows users to view and modify BIOS settings for a system after that system has been booted to an OS. According to the present disclosure, a user is not required to catch the right window in time to launch a platform setup application, but can initiate a platform-based setup at any time during system evolution without perturbing the surrounding environment. A VRI system causes a processing system to interleave contexts and receive events in a manner that provides the user with the perception of a seamlessly integrated platform setup interface. In one embodiment, the VRI core is a firmware component that reconstitutes the pre-boot environment. The VRI core may process remote queries, and may operate after the OS has been booted and in the OS afterlife, such as when the system has crashed or become unstable. When the system is subsequently reset or rebooted, the boot process may automatically use the updated BIOS settings. That is, the modified BIOS settings may be implemented upon a subsequent initialization of the processing system.

FIG. 6 and the following discussion provide a brief, general description of a suitable environment in which certain aspects or embodiments of the invention may be implemented. As used herein, the term "machine" is intended to broadly encompass a single machine, or a system of communicatively coupled machines or devices operating together. Exemplary machines include data processing systems such as personal computers, workstations, servers, portable computers, tablets, telephones, Personal Digital Assistants (PDAs), handheld devices, etc.

In FIG. 6, for example, the data processing environment 100 may include a machine or processing system 110 that includes one or more system buses 112 communicatively coupled to one or more processors 114 and to one or more volatile or non-volatile data storage devices. Those data storage devices may include, for instance, RAM 120, ROM 122, mass storage devices such hard disk drives 124, and/or other devices or media, such as floppy-disks, optical storage, tapes, flash memory, memory sticks, digital video disks, biological storage, etc. Additional components may also be coupled to system bus 112, such as one or more video interfaces 130 and one or more input/output (I/O) interface ports 140. For example, video interface 130 may be implemented as an adapter card with an interface, such as a peripheral connect interface (PCI) connector, for communicating with system bus 112. Video interface 130 and other components may also include non-volatile storage devices, such as ROM 132, with one or more firmware modules 134 stored therein.

Processing system 110 may be controlled, at least in part, by input from conventional input devices, such as keyboards, mice, etc., and/or by directives received from another machine, interaction with a virtual reality (VR) environment, biometric feedback, or other input sources or signals. Processing system 110 may include embedded controllers, such as programmable or non-programmable logic devices or arrays, application specific integrated circuits (ASICs), embedded computers, smart cards, and the like. Processing system 110 may utilize one or more connections to one or more remote machines 160, such as through a network interface 150, a modem 152, or other communicative coupling. Machines may be interconnected by way of a physical and/or logical network 170, such as a local area network (LAN), a wide area network (WAN), an intranet, the Internet, etc. One skilled in the art will appreciate that communications involving network 170 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including instructions, functions, procedures, data structures, application programs, etc. which when accessed by a machine result in the machine performing tasks or defining abstract data types or low-level hardware contexts. The data may be stored in volatile and/or non-volatile data storage. For instance, in an illustrated embodiment, processor 114 may execute VRI system 236 out of RAM 120. At times, RAM 120 may also include a copy of the current BIOS settings, a copy of any changes entered by a user, or both. Processing system 110 may receive VRI system 236 from any suitable source, including without limitation from other data storage devices within processing system 110, from one or more remote machines 182, and from processor 114.

This disclosure describes and illustrates one or more example embodiments. It will be recognized that the illustrated embodiments can be modified in arrangement and detail without departing from the spirit of the present disclosure. And, though the foregoing discussion has focused on particular embodiments, other configurations are contemplated. Even though expressions such as "in one embodiment," "in another embodiment," or the like are used herein, these phrases are meant to generally reference embodiment possibilities, and are not intended to limit the underlying concepts to particular embodiment configurations. As used herein, these terms may reference the same or different embodiments that are combinable into other embodiments.

Similarly, although an example process has been described with regard to particular operations performed in a particular sequence, it will be readily apparent that numerous modifications to that process could be applied to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing operations such as those disclosed herein. Such embodiments may also be referred to as program products. Such machine accessible media may include, without limitation, storage media such as floppy disks, hard disks, CD-ROMs, ROM, and RAM; as well as communications media such as antennae, wires, optical fibers, microwaves, radio waves, and other electromagnetic or optical carriers. Accordingly, instructions and other data may be delivered over transmission environments, including network 170, in the form of packets, serial data, parallel data, propagated signals, etc., and may be used in a distributed environment, and stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, however, it should be understood that many of the components may be implemented as hardware, software, or combinations of hardware and software for providing the functionality described and illustrated herein. In addition, the invention is not limited to any particular hardware architecture, but may be practiced in association with a wide variety of architectures, including 32-bit architectures and 64-bit architectures.

In view of the wide variety of permutations to the embodiments described herein or otherwise readily apparent, this detailed description is intended to be illustrative only, and should not be taken as limiting the scope of the invention. What is claimed as the invention, therefore, is all such implementations and modifications as may come within the scope and spirit of the following claims, as well as equivalents to such implementations and modifications.

What is claimed is:

1. A method comprising:
    initializing a processing system according to predetermined basic input/output system (BIOS) settings for the processing system;
    booting an operating system (OS) on the processing system; and
    providing a virtual runtime interface that allows a user to modify the BIOS settings for the processing system after the OS has been booted;
    wherein the operation of providing a virtual runtime interface comprises:
        transitioning the processing system from an OS context to a system management mode (SMM) context;
        determining whether an amount of time scent in the SMM context approaches an SMM time limit;
        if the amount of time spent in the SMM context approaches the SMM time limit, automatically transitioning from the SMM context back to the OS context; and
        providing a BIOS setup interface that appears persistent to the user by automatically interleaving two or more SMM contexts with two or more OS contexts.

2. The method according to claim 1, further comprising:
    receiving user input data that requests invocation of the virtual runtime interface; and
    automatically providing the virtual runtime interface, in response to receiving the user input data.

3. The method according to claim 1, further comprising:
    receiving user input data through the virtual runtime interface, wherein the user input data specifies a modified BIOS setting; and
    saving the modified BIOS setting to be implemented upon a subsequent initialization of the processing system.

4. The method according to claim 1, further comprising:
    saving state information from the SMM context before transitioning from the SMM context back to the OS context;
    after transitioning back to the OS context, determining whether a configuration session has been completed; and
    if the configuration session has not been completed, automatically transitioning from the OS context back to the SMM context.

5. The method according to claim 4, wherein the operation of determining whether a configuration session has been completed comprises:
    receiving input data from a watchdog timer for the virtual runtime interface when the processing system is in the OS context.

6. A processing system comprising:
    a processor;
    memory communicatively coupled to the processor;
    basic input/output system (BIOS) settings stored in the memory; and
    instructions stored in the memory, wherein the instructions, when executed by the processor, cause the processing system to perform operations comprising:
    detecting a BIOS configuration trigger event after the processing system has booted to an operating system (OS); and
    in response to detecting the BIOS configuration trigger event, automatically providing a virtual runtime interface that allows a user to modify the BIOS settings for the processing system, the processing system to provide the virtual runtime interface by:
        transitioning from an OS context to a system management mode (SMM) context;
        determining whether an amount of time spent in the SMM context approaches an SMM time limit;
        if the amount of time spent in the SMM context approaches the SMM time limit, automatically transitioning from the SMM context back to the OS context;
        saving state information from the SMM context before transitioning from the SMM context back to the OS context;
        after transitioning back to the OS context, determining whether a configuration session has been completed; and
        if the configuration session has not been completed, automatically transitioning from the OS context back to the SMM context.

7. The processing system according to claim 6, wherein the memory comprises:
    a first memory device that contains the BIOS settings; and
    a second memory device that contains the instructions.

* * * * *